United States Patent [19]

Saito et al.

[11] Patent Number: 4,861,603

[45] Date of Patent: Aug. 29, 1989

[54] FOOD FILLED SOYBEAN PROTEIN CASING

[75] Inventors: Toshiaki Saito; Chizuru Ueno; Fumiyuki Sunada, all of Osaka, Japan

[73] Assignee: Fuji Oil Company, Limited, Osaka, Japan

[21] Appl. No.: 95,375

[22] Filed: Sep. 3, 1987

[30] Foreign Application Priority Data

Sep. 3, 1986 [JP] Japan .................................. 61-208709
Dec. 26, 1986 [JP] Japan .................................. 61-309346

[51] Int. Cl.$^4$ .............................................. A23G 3/00
[52] U.S. Cl. .................................... 426/93; 426/138; 426/284; 426/390
[58] Field of Search .................. 426/89, 93, 138, 282, 426/284, 390, 656

[56] References Cited

U.S. PATENT DOCUMENTS

| | | | |
|---|---|---|---|
| 3,310,446 | 3/1967 | Georgevits | 426/138 X |
| 3,682,661 | 8/1972 | Turbak | 426/138 |
| 3,950,550 | 4/1976 | Katayama et al. | 426/138 X |

FOREIGN PATENT DOCUMENTS 35460 10/1973 Japan ...................................... 426/93

Primary Examiner—Arthur L. Corbin
Attorney, Agent, or Firm—Sughrue, Mion, Zinn, Macpeak & Seas

[57] ABSTRACT

This invention includes a soybean protein casing contains a filling or center material wherein the casing does not interfere with the palatability and flavor of the filling and is not destroyed or melted by heating, a method for production of fillings prepacked in said casings, and a food prepared using them.

8 Claims, 1 Drawing Sheet

FIG. 1(a)
FIG. 1(b)
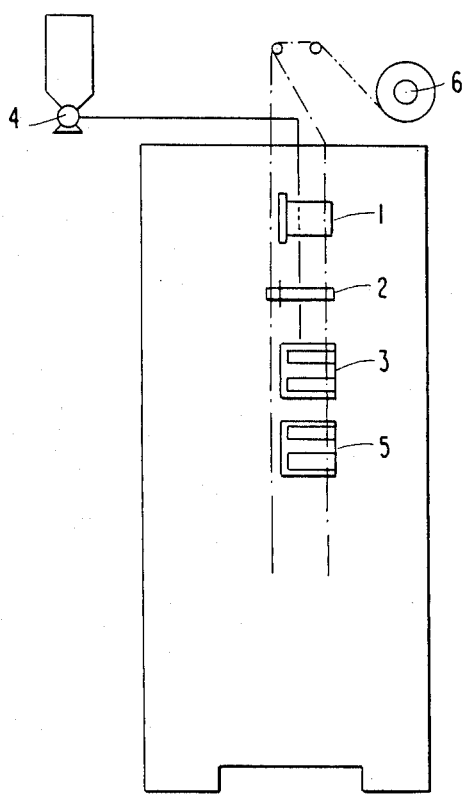
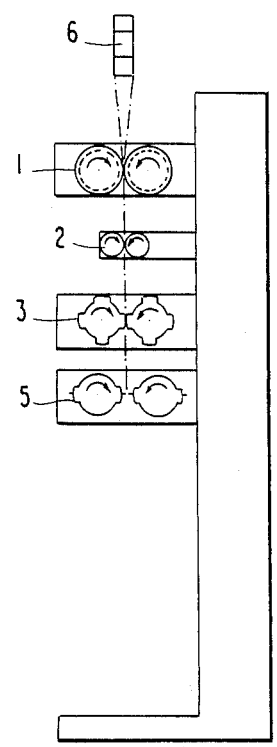
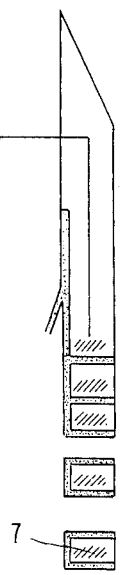
FIG. 2

FOOD FILLED SOYBEAN PROTEIN CASING

FIELD OF THE INVENTION

This invention relates to prepackaged fillings suited for use as fillings for various foods such as bakery products inclusive of bread, Japanese cakes and pastries, boiled rice and so on, foods prepared using the same, and a method for production of them.

BACKGROUND OF THE INVENTION

With the rapid changes in the mode of living and the general social orientation towards greater convenience, the so-called fast or convenience foods account for a major proportion of food consumed today. These foods are generally manufactured by processes involving a heating step such as baking and, after such heat-treatment, they are frequently filled with various fillings such as vegetable salads, meat sauces, meat patty, jam, chow mein, spaghetti, egg, fish meat, chocolate, peanut butter and what not.

However, the incorporation of such fillings is more often than not carried out manually, so that the procedure is not as hygienic as required, nor is it sufficiently quantitative. Thus, the process does not lend itself to mass production. Furthermore, when fluid or juicy fillings such as curry roux, mapo doufu, etc. are to be incorporated, it is difficult to preclude penetration or leakage of their moisture into the host food material and even if the consistency is pre-adjusted with starch or the like, it is inevitable that, the use of such a tackifier deteriorates the palatability and flavor of foods. Similarly, fillings which melt on exposure to heat, such as chocolate, ganache, jellies, peanut butter and so on, too, can hardly be incorporated in the host or substrate food prior to heating because of their inherent nature.

Meanwhile, the production of a proteinaceous container is a known technology as disclosed in U.S. Pat. No. 3,310,446 but this product is a water-soluble container manufactured using a large quantity of a wetting agent and is intended for packaging dry ingredients which are to be dissolved or dispersed in water. Moreover, the materials contained are not "fillings" in the correct sense of the term. Further, yuba or dried bean curd, which is a traditional Japanese food, is logically a kind of proteinaceous casing material but it has never been used in the form of a pouch or the like.

Further, it is inconvenient to heat-seal a protein film and then fill the resultant casing with fillings manually. Moreover, when the fillings are high in water content and of low viscosity, the filling operation is not easy even by a manual procedure. And even today when we are seeing remarkable progresses in packaging technology and witnessing many cases of implementation, we do not know of a case in which the incorporation of fillings, particularly moist ingredients, in edible film casings has ever been performed continuously and mechanically.

SUMMARY OF THE INVENTION

It is an object of this invention to provide a filling or center material as quantitatively prepackaged in an edible unit container which is by itself tasteless and odorless, does not interfere with the palatability and flavor of filling ingredients, and is not destroyed or melted by heating.

It is another object of this invention to provide a continuous and mechanical method for production of fillings prepackaged in unit casings.

It is a further object of this invention to provide prepackaged fillings which are amenable to commercial distribution and thereby provide a means for rationalizing the production of filled pastries, bread, Japanese cakes, boiled rice and so forth.

A further object of this invention is to provide novel filled cakes, bread, Japanese cakes, boiled rice and other foods.

These objects, have been attained by providing a food comprising a filling contained in a casing comprising at least one soybean protein, a food prepared using them, and a method for their production.

BRIEF DESCRIPTION OF THE DRAWINGS

FIG. 1 is a schematic view showing a filling-packaging machine which can be used in the practice of this invention, FIG. 1 (a) and FIG. 1 (b) of which are a front view and a side elevation view, respectively.

FIG. 2 is a diagrammatic view illustrating the flow of the protein film in the manufacturing method of this invention.

DETAILED DESCRIPTION OF THE INVENTION

This invention relates to a food or confectionery filling prepackaged in an edible casing or pouch, said casing being made of soybean protein film or preferably water-insoluble soybean protein film.

The aforementioned soybean protein film can be prepared by casting and drying a soybean protein solution or paste.

The soybean protein may be an aqueous extract of whole or defatted (solvent-extracted) soybean protein, an isolated soybean protein thereof, a protein fraction such as 11S fraction, or a dried preparation thereof. Generally speaking, the higher the crude protein content (hereinafter referred to as CP) is, the superior is the filled casing in flavor and strength. Therefore, it is preferable to use a soybean protein with at least 60% crude protein based on the total solid matter and particularly an isolated soybean protein. It is also preferable that CP in the soybean protein solution or paste accounts for 4 to 35%.

The soybean protein solution or paste may contain, in addition to the soybean protein and water, such optional known ingredients as oils and fats, saccharides, wetting agents/plasticizers, emulsifiers, coloring matters, condiments, flavors, other proteins and so on. Furthermore, unless the fundamental features of this invention such as the film-forming property of the protein are not adversely affected, there may also be incorporated various materials which do not have any appreciable gelation property, e.g., powders or pastes of vegetables (carrot, spinach, corn, pumpkin, etc.), seaweeds (laver, wakame seaweed, etc.), mustard, and so on. The soybean protein casing may itself be substantially enclosed within an edible outer portion.

Among the aforementioned ingredients, oils and fats contribute to improvements in the flavor of the product, and saccharides which may be glucose, sucrose, dextrin, starch, etc. help reduce the setting of the protein solution or paste on standing to improve its workability, assure a uniformity of film thickness and minimize the surface roughening, thereby contributing to quality maintenance. Edible polyhydric alcohols such as glycerol, sorbitol, mannitol, propylene glycol, etc. may be used as said wetting agents/plasticizers and help impart the desired plasticity, gloss and other qualities to the dried product. The preferred proportions of these additive ingredients based on CP are 0.1 to 1 time, by weight for oils and fats, 0.05 to 0.5 times by weight for saccharides, and 0.05 to 0.45 times by weight for wetting agents/plasticizers. Addition of less than the above ranges would not produce the expected effects of these additives, while the use of excesses would deteriorate the film strength.

While the intrinsic soybean protein is water-soluble, it can be rendered insoluble by giving a thermal hysteresis treatment at a temperature of 70° C. or more, such as boiling, thermal ray irradiation, high frequency induction heating or the like after casting into a film but prior to drying and film-forming and such a thermally modified protein shows only swelling at most. Therefore, even when casings made of it are filled with non-heat coaguable fluid fillings with a high water content of about 30 to 90%, the fillings do not leak out. Particularly when the product is to be eaten immediately after heating such as baking, fillings of still higher water content can be filled into such protein casings. On the other hand, when fillings are oleaginous materials such as chocolate, butter, margarine, butter cream and peanut butter, hot melts of them do not leak out even when the protein film is water-soluble and return to the original state in situ on cooling. Moreover, since the above soybean protein film is thermoplastic, it can be heat-sealed to provide casings of any desired shape, so that fillings can be enclosed securely in the casing. The shape of the casing may be bar-shaped, spherical, bun-shaped, disk-shaped, triangular, rugby ball-shaped, rectangular, die-shaped or what not, which is not deemed to be limited thereto.

However, manual insertion of the fillings and heat sealing is time- and labor-consuming. Moreover, the manual operation is not easy when fillings are low-viscosity fluids of high water content. Accordingly the present inventors conducted an intensive research into the possibility of simultaneous continuous, mechanical pouch formation and food filling and found that the use of a protein film having a certain degree of strength as obtained by heat-treatment prior to drying in combination with a certain pouch-forming/filling technology enables a continuous, mechanical production of filled foods. It has also been found that the fillings prepackaged in such an edible casing can be fluid aqueous materials and that the casing does not break or melt on heating, thus contributing much to the confectionery and bakery industries.

Thus, this invention also relates to a method of manufacturing an assortment of fillings in an edible prepackaged casing which is a continuous strip of protein film obtained by the casting, heating, drying and taking-up of a soybean protein solution or paste. Once this continuous strip of protein is completely wound at one end, rewinding of the protein strip begins toward the opposite direction while the protein strip is heat-sealed at edges either in the manner of cantilever closure or envelope closure to produce a continuous hollow cylinder which is then alternatingly and intermittently filled with the prepackaged fillings and heat sealed in a crosswise direction. The method is described in detail hereinafter.

It is not necessary either to defoam or whip the soybean protein paste or solution specifically. Such strong defoaming as to lose gas-permeability of the film will apt to cause a rupture of the filled casing on heat-sterilization, particularly at the heat-seal portion. On the other hand, whipping as to be attained by using a whipping machine will cause decrease of film strength and thus cause not only a difficulty of the continuous taking up process but also cause a leakage of a high water content fillings or low viscosity fillings.

The soybean protein paste or solution is cast onto a flat smooth surface to produce a film. In order that the film so formed may be easily taken up, said flat smooth surface is preferably an endless surface, for example that of a belt conveyor. Moreover, in order to produce a homogeneous, thin film with a thickness of not more than 1 mm, it is generally most advantageous to use a surface with good releasability, such as that of a fluorinated material such as polytetrafluoroethylene (trade name: Teflon).

It is important that the cast film be heated prior to drying. If this heat treatment is omitted, the film will be lacking in mechanical resistance to the continuous cylinder-forming and filling operation to be described hereinafter and particularly in mechanical strength on contact with water-rich fillings. The heating system is preferably an internal heating scheme or a heating system utilizing a water vapor atmosphere, and the degree of heating is preferably such that the film shows signs of gelation. If the film is dried without this gelation, the film temperature will increase as its water content is decreased, so that it is difficult to assure sufficient heat resistance and mechanical strength (particularly mechanical resistance on contact with water-rich fillings). It is preferable that the gelation take place on the whole face and reverse sides of the film. The film which has undergone gelation only on one side is not conducive to sufficient mechanical strength.

The "internal heating" referred to above is the so-called autogenous heating as caused by the excitation and oscillation of molecules, especially water molecules, upon electromagnetic irradiation. Specifically, heating by irradiation with far infrared rays on high-frequency radiation may be mentioned. While the required irradiation time is dependent on the radiation source and its output, it is generally not less than 20 seconds. The heating in a water vapor atmosphere can be advantageously performed with steam at 70° to 120° C., preferably 80° to 110° C., for at least 40 seconds. In the case of internal heating however, it is sometimes advisable to carry out intermittent heating in order to preclude too steep a temperature gradient or profile which might cause foaming and swelling or charring.

The drying operation which is carried out next can be performed by means of a hot air current, freeze-drying, infrared heating and far infrared heating, for instance. The latter two methods of drying can be simultaneously conducted with the pre-drying heat treatment. The degree of drying is preferably down to a water content of not more than 25% and preferably not more than 10%. If the degree of drying is insufficient, the film may undergo inter-play adhesion after takeup.

The film to be used in accordance with this invention must be taken up on a roll core, for instance. The takeup length is preferably not less than 50 m and more preferably not less than 100 m. Further, the takeup is preferably carried out in at least one reciprocation. Thus, by taking up the film once and, then, rewinding it, improvements can be realized in takeup tension, uniformity of takeup, and accuracy of takeup and even though the soybean protein film is not as tough as synthetic resin films, the incidence of film damage in the subsequent continuous process is remarkably reduced to facilitate the continuous operation. Usually the takeup operation is combined with the slitting of the film to width and it is preferably so arranged that the splitting operation be performed in the last takeup stage when a multiple takeup scheme is employed as mentioned above. The width depends on the desired product and is generally more than 10 mm and more often within the range of 20 to 80 mm.

In accordance with this invention, the resulting continuous strip of soybean protein film is rewound and simultaneously heat-sealed at edges in the manner of cantilever closure or envelope closure to give a continuous hollow cylinder and, then, this hollow cylinder is intermittently and alternatingly filled with the filling and heat-sealed in the crosswise direction of the cylinder.

The above operation will be described in further detail with reference to the accompanying drawing, taking the cantilever closure method as an example. The continuous protein film 6 rewound from a roll is folded in two about the axis of tension and the lapped edges are heat-sealed with a heater roll 1 to give a continuous hollow cylinder. Then, this hollow cylinder is continuously and alternatingly filled with the filling and heat-sealed with heater bars 3 in its crosswise direction. When said heater roll 1 is a pair of revolving rollers with an appropriate nip clearance and/or said heater bars are provided in 1 or more units per heater roll, an appropriate pulling tension can be applied to the film. However, it is optional to build a suitable driving source into the setup and such a driving system is obvious to those skilled in the art.

The overlapped part of the film which is heat-sealed should consist of no more than 3 laps and preferably 2 laps, for multiple laps rather tend to cause leakage of fillings. In this respect, the cantilever closure method gives only a two-lap joint and is preferable.

It is also preferred to provide a guide means, which may for example be wedge-shaped, between the protein film roll 6 and the heater roll 1 so as to assure a stable folding of the rewound protein film.

The preferred sealing temperature is about 120° to 135° C. for both heater systems. If the sealing temperature is below the above-mentioned range, thermal welding will not be sufficient. Conversely, the use of a sealing temperature beyond the range tends to cause charring and shrinkage.

From the standpoints of attractiveness and palatability of final products, the width of the two seals is preferably not more than 4 mm. To assure this, a slitter 2 is preferably interposed between the heater roll and the heater bar 3. The width of the seal by the heater bar is preferably not more than 8 mm.

In the practice of this invention, it is essential that the formation of crosswise seals of the cylinder and a quantitative supply and dosing of the filling be alternatingly and intermittently performed. Unless this is ensured, filling may be tucked into the weld to cause a faulty seal or a breakage of the seal, failing to provide a completely sealed package.

Therefore, it is necessary to feed the filling with an intermittently driven constant-rate or metering pump 4 and synchronize this supply with the idle time of the heater bars.

It should be understood that a tubular casing can be expediently prepared by extruding a high viscosity protein paste with a low water content from an annular orifice into a dehydrating-modifying bath such as alcohol and drying the extrudate and that since such casing is seamless, it can be used with advantage for the purposes of this invention.

The filling to be packed into the above casing may be any material that is edible and not too high in water content. Thus, for example, vegetable salad, cream soup, meat sauce, stew, meat patty, bean jam, chowder, mabo doufu, wasabi-soy, marzipan, jam, marmalade, honey, syrup, meringue, chow mein, spaghetti, egg, fish meat, ganache, jelly, chocolate, butter, margarine, butter cream, custard cream, peanut butter, cream cheese, Bavarian cream and cream, as well as mixtures thereof if desired, may be mentioned. It should, of course, be understood that the above is only a partial listing of fillings which can be used in accordance with this invention.

When fillings are rich in water, the crosswise seals of the filled casings are cut preferably soon after filling and for this purpose, it is advantageous to build a cutter means into the heater bar unit to effect this cutting simultaneously with heat sealing or, as shown in the drawing, it is advantageous to dispose a rotary cutter downstream of the heater bar unit. Thus, although the soybean protein film used in this invention is resistant in a certain degree to swelling in contact with water, such swelling makes it difficult to automatically cut the casing in the position exactly corresponding to the seal between two doses of the filling.

After the filling operation and, if necessary, after the cutting of the casing between doses of the filling, the product is preferably stored at a low temperature until cooking or eating and more preferably stored frozen in order to arrest the progress of aqueous swelling and thereby preclude breakage and deformation.

The resulting filling prepackaged in the edible casing can be used as a filling or center for confectionary and bakery products. As typical modes of use, one may fill a dough for cakes or bread with such a prepackaged filling and, then, bake the filled dough or fill the baked product with the filling and warm it before eating according to an usual manner. Alternatively, one may heat the filling only and fill a baked food with the hot filling.

The product according to this invention is virtually free from leakage of the filling material even when the water content of the filling material is high and even leakage of the molten oleaginous material, with the result that it is compatible with fluid fillings which could not heretofore be utilized as fillings. Further, even chocolate which melts on heating and could only be filled into baked confectionary or bakery products can now be incorporated even in doughs prior to baking. Moreover, since the casing is tasteless and odorless, it does not adversely affect the palatability and flavor of fillings. In addition, the process of incorporating the prepackaged filling of this invention in host food materials such as doughs and bread can be easily automated.

For the reasons mentioned above, this invention not only contributes to an increased variety of daily diets through the supply of cakes and bread containing new types of fillings but also to an increased productivity of such foodstuffs.

The following examples and comparative example are further illustrative of this invention and should by no means be construed as limiting the scope of the invention.

EXAMPLE 1

(Production of a soybean protein film)

A high-speed cutter was charged with 500 parts (by weight; the same applies hereinafter) of water and with stirring, 100 parts of isolated soybean protein powder (trade name; New Fujipro R, manufactured by Fuji Oil Co., Ltd.), 30 parts of hydrogenated soybean oil, 40 parts of sorbitol, 20 parts of starch and 3.5 parts of sodium chloride to give a viscous emulsion paste.

The above emulsion was cast in a thickness of 0.6 mm on a Teflon sheet and, then, irradiated with far infrared radiation from the reverse side of the Teflon sheet for about 30 seconds. Then emulsion layer on the sheet was then dried in a hot air current at 105° C. for 4 minutes to give a soybean protein film with a thickness of 0.18 mm, a moisture content of 9%, and weighing 105 g/m².

EXAMPLE 2 AND COMPARATIVE EXAMPLE (Production of fillings)

The soybean protein film obtained in the above example was cut to 5 cm×15 cm rectangular strips and the two major sides and one minor side of each strip were heat-sealed using a heat sealing machine to give a casing sized 2.5 by 15 cm.

On the other hand, 20 parts of minced chicken, 30 parts of minced vegetable, 48 parts of white sauce (water content 75%) and 2 parts of a condiment mix were blended to prepare a white sauce for filling use. This white source was filled into the above casing and the remaining open minor side of the casing was closed by heat-sealing to give a bar-shaped prepackaged filling A according to this invention.

As a control, the same filling material as above was filled into a commercial collagen casing (trade name, "DEVRO" casing, sold by Johnson & Johnson Japan Inc.) and ligated to give a control filling B.

TEST FOR COMPARISON

Each of the above prepackaged fillings was heated in three different manners, namely by boiling, in a microwave oven, and in a heater oven, to compare the heat resistances. The results are set forth in the following table 1.

TABLE 1

| Fillings | Heat conditions | | |
| --- | --- | --- | --- |
| | Boiling 80° C., 30 min. | Microwave oven 600 W, 1 min. | Heater oven 200° C. 15 min. |
| Filling A, (Invention) | Good without rupture or melting | Good without rupture or melting | Good without rupture or melting |
| Filling B, (Control) | Broken at ligated end, with contents flowing out | Film ruptured, with contents flowing out | Unligated, with contents flowing out |

EXAMPLE 3

(Production of a Danish pastry filled with the filling of this invention)

The filling A prepared in Example 1 was steamed at 80° C. for 30 minutes and stored frozen for 3 days. It was then thawed and wrapped in a Danish pastry dough with both ends exposed and baked at 200° C. for 15 minutes to give a white sauce-filled Danish pastry food. This Danish pastry was cut crosswise and the contents were examined. The prepackaged filling remained unruptured and the pastry was delicious.

EXAMPLE 4

(Production of hot dog filled with the filling of this invention)

The filling A prepared in Example 1 was frozen for 3 days, sandwiched as frozen in an incised loaf of bread, and heated in a microwave oven for 90 seconds. Then, the product was taken out from the oven and the filling was examined. There was no rupture of the casing and the product was delicious.

EXAMPLE 5

The cure material of the filling A according to Example 1 was replaced with curry roux to give an otherwise similar prepackaged filling. This filling was steamed at 85° C. for 45 minutes and then stored in a refrigerator. This product was heated in a microwave oven (600 W) for 20 seconds, and using sheets of laver and boiled rice, curry rolls were prepared.

EXAMPLE 6

Using wasabi (horse radish)-soy, a prepackaged filling similar to that prepared in Example 1 was prepared. This filling was wrapped up in minced fish meat, steamed at 85° C. for 40 minutes, and cooled to give a kamaboko (fish paste) filled with wasabi-soy.

EXAMPLE 7

A high-speed cutter was charged with 12000 parts of water and 2500 parts of isolated soybean protein powder (Fujipro R, manufactured by Fuji Oil Co., Ltd.; CP content 85%) and with stirring, 700 parts of hydrogenated soybean oil, 1000 parts of sorbitol, 500 parts of starch and 85 parts of a condiment mix to give a viscous emulsion paste. This paste was continuously cast onto a Teflon-coated endless belt in a thickness of 0.6 mm and a width of 47 cm and irradiated with far infrared radiation from the face side of the sheet for about 30 seconds (the film at the exit of the irradiation zone showed gelation). The film was then dried in a hot air current at 105° C. for 4 minutes and continuously exfoliated from the belt for a first takeup. In subsequent rewinding, the film was trimmed off by about 1 cm at each edge and slit into 9 cm-wide strips by means of a rotary cutter unit to give 5 rolls of film with a width of 9 cm, a thickness of 0.2 mm, a moisture content of 9%, and a length of 130 m.

As shown in the drawing, the continuous protein film 6 thus obtained was folded as it was pulled by the heater roll 1 (temperature 130° C.) to fabricate a cylinder with a seal width of about 8 mm and an inside dimension of 37 mm. This cylinder was cut with a slitter 2 to give a seal width of 4 mm. Then, heat-sealing in a cross-wise direction with a pair of rollers 3 equipped with 4 heater bars (temperature 130° C.) and filling with 23 g portions of a prepared mapo doufu with a piston pump 4 were carried out in an alternating sequence to give a continuous series of filled casings. The series of filled casings was cut into individual units with a rotary cutter 5 to give mapo doufu prepackaged in edible casings with an outer width of 41 mm (inner width 37 mm) and an outer length of 120 mm (inner length 108 mm).

As described above, this invention provides fillings prepackaged in casings which are tasteless and odorless, do not adversely affect the palatability and flavor of food, or do not rupture or melt on heating. Furthermore, in accordance with this invention, the formation of edible casings and the incorporation of fillings in the casings which had to be done manually can be carried out mechanically and automatically and even water-rich low-viscosity fillings can be processed with ease in large quantities and in reduced time periods. As a result, this invention contributes a great deal to an increased variation of diets and to the rationalization of production of filled cakes, bread, boiled rice and so on.

While the invention has been described in detail and with reference to specific embodiments thereof, it will be apparent to one skilled in the art that various changes and modifications can be made therein without departing from the spirit and scope thereof.

What is claimed is:

1. A filled food comprising a non-heat coagulable wet filling material having moisture content of about 30 to 90% contained in a water insoluble soybean protein film casing, said casing containing 0.05 to 0.45 parts of a wetting agent per 1 part of crude protein in the casing, and said casing being in sealed form which completely covers said filling material and which does not break or melt under food heating conditions.

2. A filled food as claimed in 1, wherein said filling is fluid at room temperature or serving temperature.

3. A filled food as claimed in claim 1, wherein said casing is a heat-sealed casing.

4. A filled food as claimed in claim 1, wherein said soybean protein contains at least about 60 wt % crude protein based on the total solids content of said casing.

5. A filled food as claimed in claim 4, wherein said soybean protein is an isolated soybean protein.

6. A filled food as claimed in claim 1 further comprising an edible out portion substantially enclosing said soybean protein film casing containing said filling.

7. A filler food as claim 6, wherein said filled food is capable of being heated to cook said outer portion, said filling being substantially retained in said casing during said cooking.

8. A filled food as claimed in claim 1, wherein said wet filling material is selected from the group consisting of vegetable salad, cream soup, meat sauce, stew, bean jam, chowder, mapo doufu, wasabi-soy, chow mein and spaghetti.

* * * * *